United States Patent [19]

Scaramucci

[11] Patent Number: 4,852,607
[45] Date of Patent: Aug. 1, 1989

[54] SUPPORT FOR CHECK VALVE DISC

[76] Inventor: John P. Scaramucci, 10724 Woodridden, Oklahoma City, Okla. 73170

[21] Appl. No.: 213,266

[22] Filed: Jun. 29, 1988

[51] Int. Cl.⁴ ............................................. F16K 15/03
[52] U.S. Cl. .............................. 137/515.7; 137/527.4; 137/527.8
[58] Field of Search ................... 137/515.7, 527–527.8

[56] References Cited

U.S. PATENT DOCUMENTS

| | | |
|---|---|---|
| 2,532,067 | 11/1950 | La Bour . |
| 3,565,107 | 2/1971 | Bunch . |
| 3,626,148 | 12/1971 | Woytowich ..................... 137/527.8 |
| 3,720,228 | 4/1973 | Wheatley, Jr. . |
| 3,817,277 | 6/1974 | Wheatley . |
| 3,933,173 | 1/1976 | Kajita . |
| 4,201,241 | 5/1980 | Schertler . |
| 4,230,150 | 10/1980 | Scaramucci . |
| 4,274,436 | 6/1981 | Smith .............. 137/527 X |
| 4,586,534 | 5/1986 | McNeely ........................ 137/527 X |
| 4,605,041 | 8/1986 | Teumer . |

FOREIGN PATENT DOCUMENTS 2079406 11/1980 United Kingdom ............. 137/527.8

Primary Examiner—Robert G. Nilson
Attorney, Agent, or Firm—Dunlap, Coddina, Peterson & Lee

[57] ABSTRACT

A swing check valve having a disc where the opposite end portions of the hinge pin of the disc are supported on flat surfaces formed at the opposite ends of a segmented ring surrounding a portion of the valve seat seating area.

18 Claims, 5 Drawing Sheets

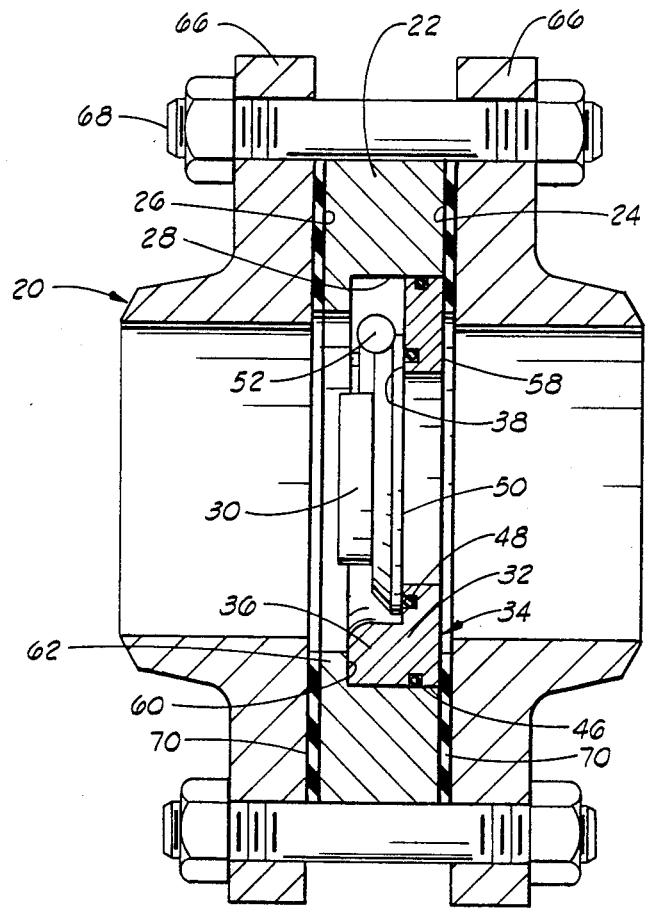
FIG. 1
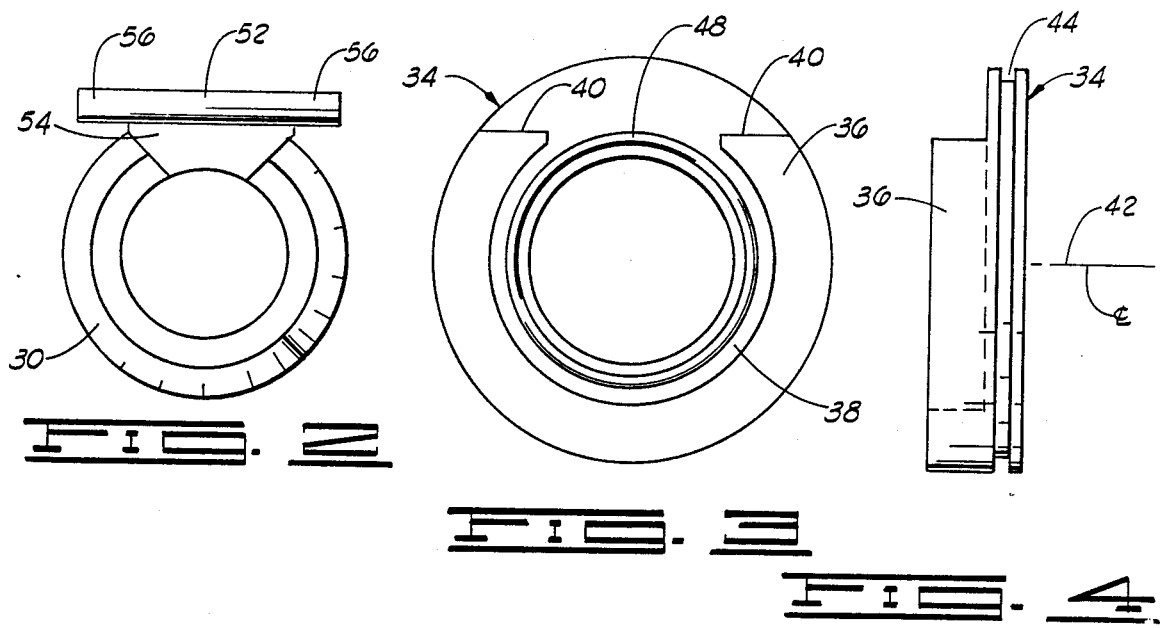
FIG. 2
FIG. 3
FIG. 4

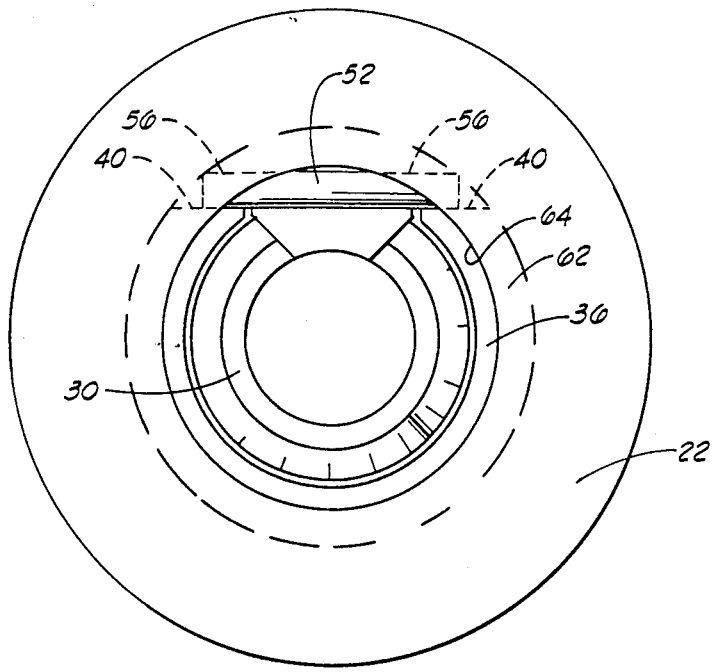
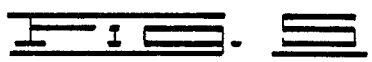
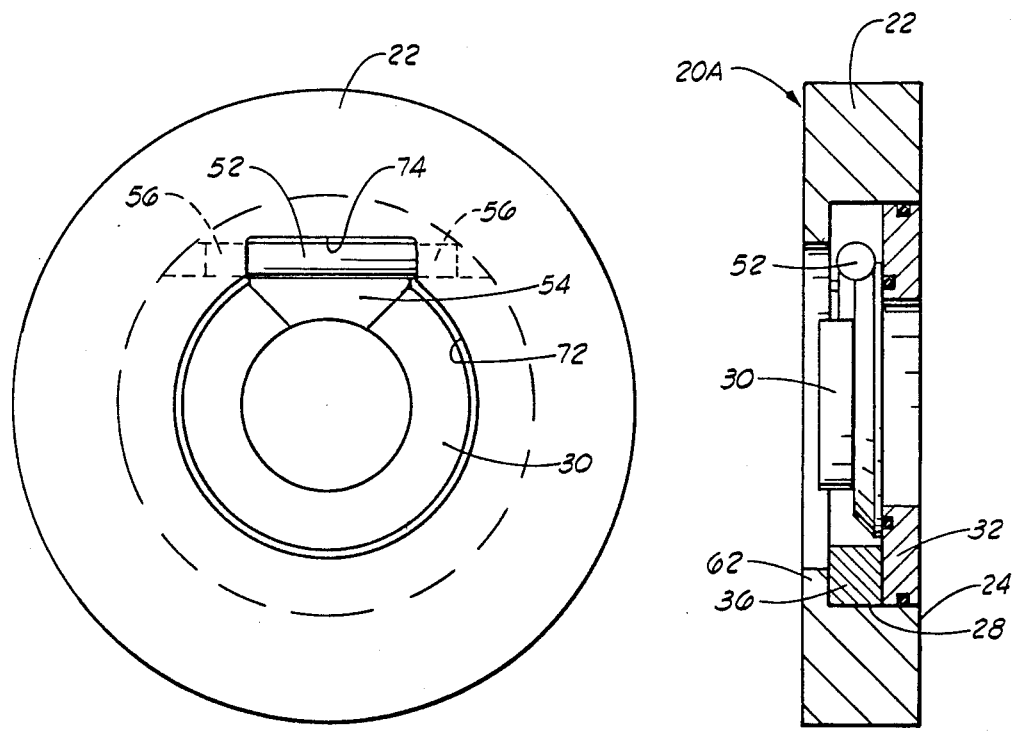
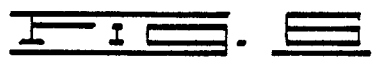   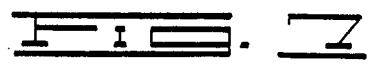

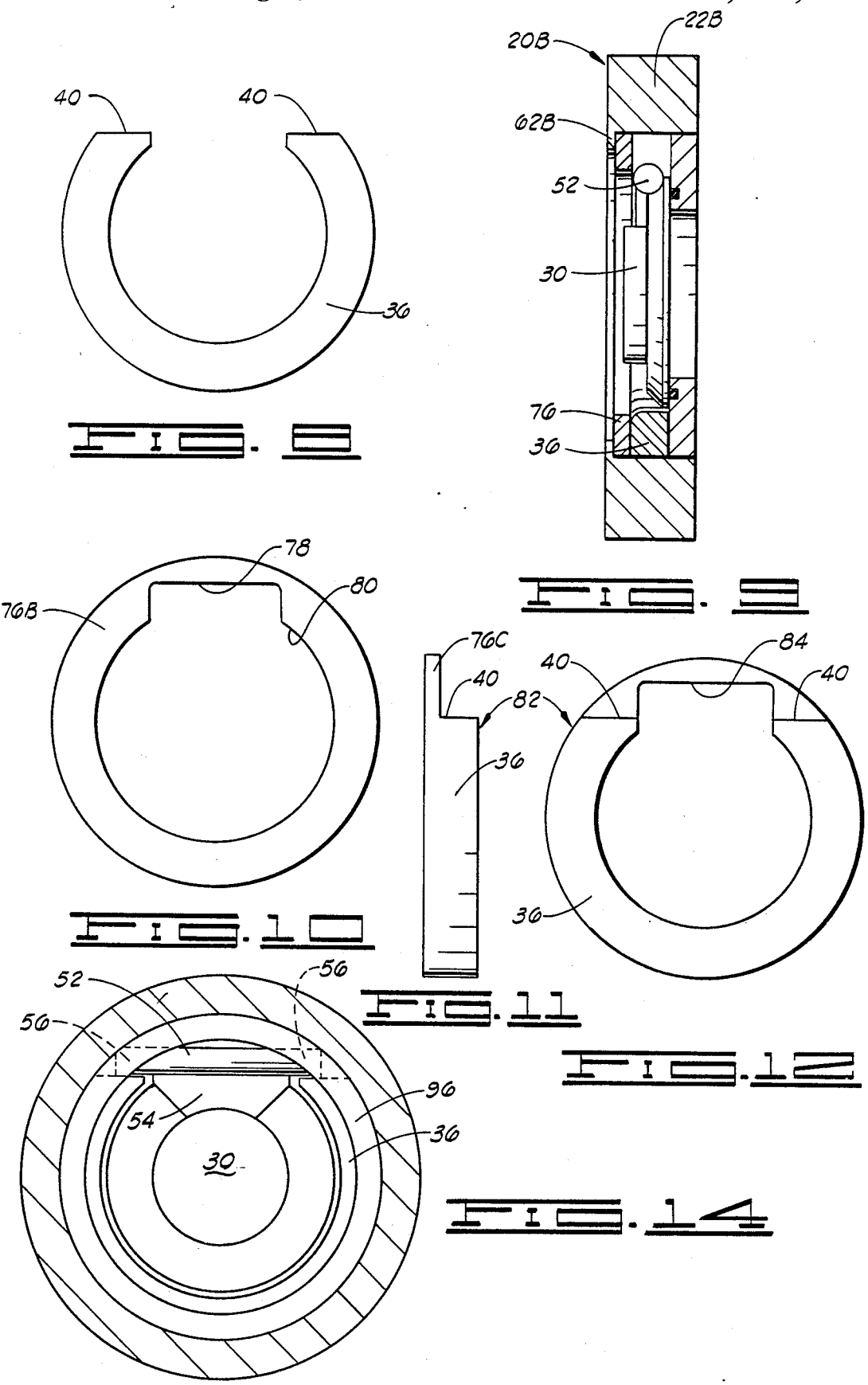

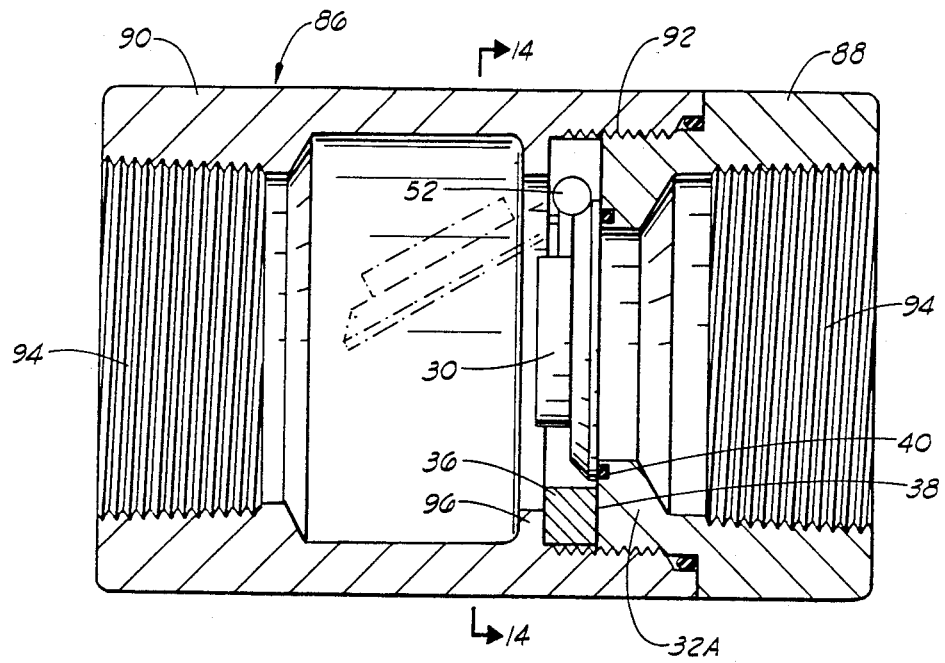
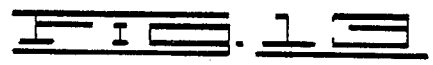
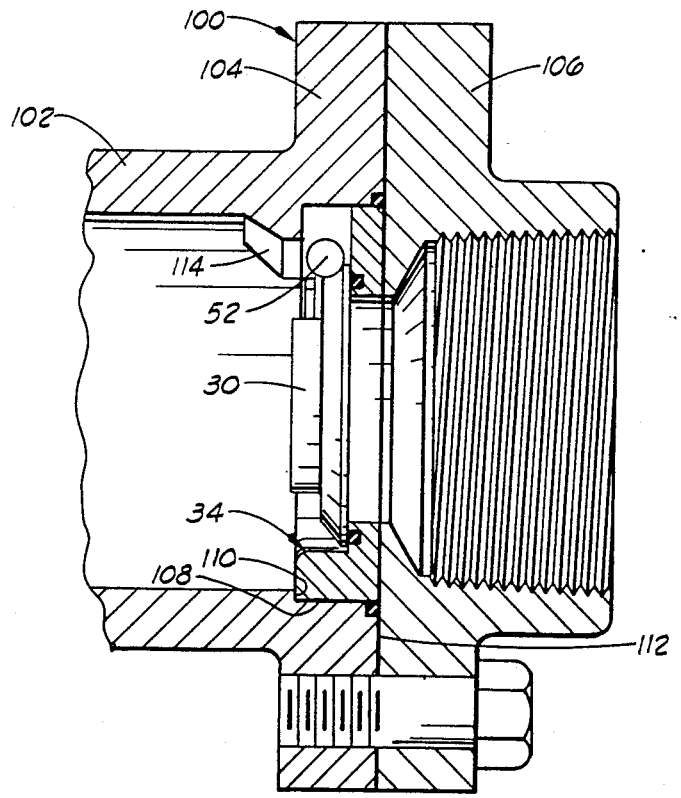

SUPPORT FOR CHECK VALVE DISC

CROSS REFERENCES TO RELATED APPLICATIONS

This application is related to co-pending Ser. No. 049,383, filed May 13, 1987, entitled Swing Check Valve, now U.S. Pat. No. 4,809,738 Ser. No. 060,249, filed June 9, 1987, entitled Swing Check Valve Disc, now U.S. Pat. No. 4,718,214 Ser. No. 077,907, filed July 27, 1987, entitled Swing Check Valve With Hinge Pin Retainer, now abandoned; Ser. No. 078,410, filed July 27, 1987 entitled Swing Check Valve With Hinge Pin Insert, now abandoned; Ser. No. 088,250, filed Aug. 24, 1987, entitled Swing Check Valve With Removable Cage and Disc, now U.S. Pat. No. 4,781,212; Ser. No. 093,973, filed Sept. 8, 1987 entitled Check Valve Seat and Cage Retainer, now U.S. Pat. No. 4,782,855 ; Ser. No. 168,506, filed Mar. 15, 1988, entitled Check Valve, now U.S. Pat. No. 4,809,739 ; and Ser. No. 168,507, filed Mar. 15, 1988, entitled Check Valve, now U.S. Pat. No. 4,809,741.

BRIEF SUMMARY OF THE INVENTION

1. Field of the Invention

This invention relates to improvements in swing check valves.

2. Background of the Invention.

In many swing check valves it is desired that the disc be supported in such a way that it can "float" onto and off of the seat. This normally provides a more even seating of the disc on the valve seat. Heretofore, the opposite end portions of the hinge pin of the disc have been supported in grooves which extend either axially or radially with respect to the flow axis through the valve—in each instance the dimensions of the groove being greater than the radial dimensions of the hinge pin to allow movement of the hinge pin which may be characterized as a sliding movement, rather than solely a pivoting movement. Normally, the opposite end portions of the hinge pin are trapped in the supporting grooves.

BRIEF DESCRIPTION OF THE DRAWINGS

FIG. 1 is a vertical cross sectional view through a portion of a wafer-type swing check valve constructed pursuant to this invention with the disc being shown in side elevation.

FIG. 2 is an elevational view of the disc looking at the left hand side of the disc as shown in FIG. 1.

FIG. 3 is an end elevational view of the support and seat for the disc in the valve of FIG. 1.

FIG. 4 is a side elevational view of the support and seat for the disc shown in FIG. 3.

FIG. 5 is an elevational view of the left hand end of 15 the valve body shown in FIG. 1, with the opposite end portions of the hinge pin being shown in phantom.

FIG. 6 is a view similar to FIG. 5 showing an optional body shape.

FIG. 7 is a vertical cross sectional view similar to FIG. 1, showing a different form of valve constructed pursuant to this invention.

FIG. 8 is an end view of the support for the hinge pin of the disc of the valve of FIG. 7.

FIG. 9 is a vertical cross sectional view through another form of valve constructed pursuant to this invention.

FIG. 10 is an end view of a hinge pin retainer for the valve of FIG. 9.

FIG. 11 is a side elevational view of another form of hinge pin support and hinge pin retainer.

FIG. 12 is an end elevational view of the support and retainer shown in FIG. 11.

FIG. 13 is a cross sectional view through another form of valve constructed pursuant to this invention.

FIG. 14 is a cross sectional view taken along lines 14—14 of FIG. 13.

FIG. 15 is another form of valve constructed pursuant to this invention.

DETAILED DESCRIPTION OF THE DRAWINGS

Figure 16:
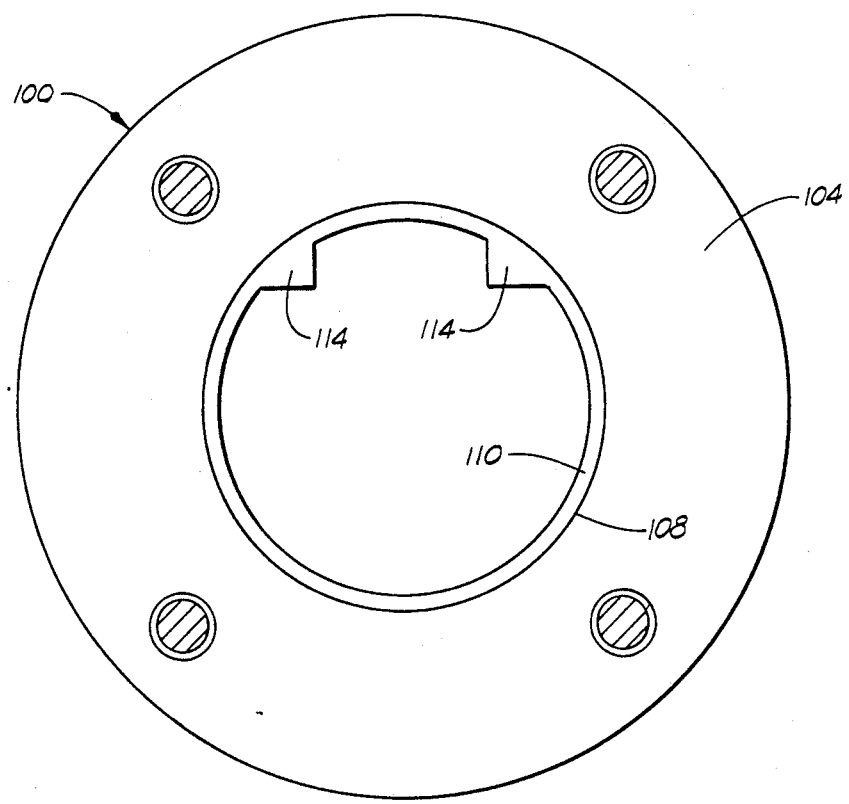
FIG. 16 is an end view of the valve body of the valve of FIG. 15 with the seat and disc removed.

Referring to the drawings in detail, and particularly to FIG. 1, reference character 20 generally designates one form of valve constructed pursuant to this invention. The valve 20 comprises a wafer-type valve body 22 having planar upstream and downstream ends 24 and 26 along with a bore 28 extending therethrough. A valve disc 30 is supported in the valve body 22 for opening and closing the bore 28 through the valve in cooperation with a ring shaped seat 32 fitting in the bore 28.

As shown most clearly in FIGS. 3 and 4, the seat 32 is a portion of a member generally designated by reference 34 which comprises the seat 32 and a hinge pin support portion 36. The support portion 36 is in the form of a segmented ring extending around the major portion of the annular seating area 38 of the valve seat portion 34 and terminating in flat surfaces 40 in a plane parallel with the centerline 42 through the seating area 38. The flat surfaces 40 are also located in a plane positioned radially outward of the seating area 38 and support the opposite ends of the hinge pin for the disc 30 as will be set forth below.

The seat ring portion 32 has an annular groove 44 in the outer periphery thereof to hold an O-ring seal 46 as shown in FIG. 1 to sealingly engage the walls of the bore 28. Similarly, a seal ring 48 is held in a mating groove in the seating area 38 of the valve seat 32 to be engaged by the disc 30 when the disc 30 is in a closed position.

As shown in FIGS. 1 and 2, the disc 30 is in the form of a substantially round, flat body having a sealing face 50 of a size to engage the annular seating area 38 of the valve seat 32, and is provided with a hinge pin 52 formed integrally with the main body portion of the disc. A transition section 54 extends from a portion of the main body portion of the disc 30 to the central portion of the hinge pin 52 to provide adequate connection between the hinge pin and the disc. The hinge from 52 extends parallel with the seating face 50 of the disc. The opposite end portions 56 of the hinge pin 52 project from not only the transition 54 but also the main body portion of the disc 30 and when seated on the flat surfaces 40, engage the walls of the valve body bore 28 to hold the disc in position for even seating.

The combination seat and hinge pin support member 34, along with the disc 30 are positioned in the valve body 22 with the outer, planar end 58 of the member 34 being aligned with the upstream face 24 of the body 2 and the opposite end 60 of the member 34 being in engagement with a radially inwardly extending, annular flange 62 formed in the valve body 22 at the downstream end of the valve. As shown in FIG. 5, the inner surface 64 of the flange 62 is of a diameter such that the flange 62 overlaps the opposite end portions 56 of the hinge pin 52 to hold the opposite end portions of the hinge pin on the flat surfaces 40. In this connection, it will be observed that the diameter of the hinge pin 52 is less than the dimensions of the flat surfaces 40 extending along the axis of the valve, whereby the disc 30 can float to and from the seat 32 during the initial opening and final closing movements of the disc 30.

The valve 20 is held between mating pipe flanges 66 interconnected by standard bolts 68. Normally, gaskets 70 are interposed between the opposite end faces of the valve body 22 and the respective flanges 66.

The flange 62 may be provided with a smaller inner diameter, providing an annular surface 72 only slightly larger than the outer diameter of the disc 30. In this event, the flange 62 has an enlarged, generally rectangular opening 74 at one side of the opening 72 through the flange sized to provide clearance for the transition 54 of the valve disc when the valve disc 30 is moved in an opening direction, whereby the disc can turn through approximately 90° in its opening movement and provide a full opening valve. It will be observed in FIG. 6 that with this construction, the flange 62 still overlaps the opposite end portions 56 of the hinge pin 52 to hold the disc 30 in operating position.

A slightly modified valve 20A is illustrated in FIG. 7. In this structure, the valve seat 32 and hinge pin support 36 are separate members sized to slidingly fit in the circular bore 28 of the valve body 22 with the support 36 engaging the flange 62 and the outer face of the seat ring 32 being coterminous with the upstream face 24 of the valve. In this form, the support 36 is in the form of a segmented ring as more clearly illustrated in FIG. 8, where the opposite end portions of the ring 36 provide the flat surfaces 40 for supporting the opposite end portions of the hinge pin 52 when the valve is fully assembled.

Another modified wafer-type valve 20B is illustrated in FIG. 9. In this structure, the modified valve body 22B is provided with a thinner flange 62B at the downstream end of the bore 28 and with the flange 62B being of a larger inner diameter. In this form of valve, a separate retaining ring 76 is interposed between the flange 62B and the hinge pin support 36 to retain the opposite end portions of the hinge pin 52 on the flat surfaces 40 of the support 36. The inner diameter of the retaining ring 76 is sized to expose the transition 54 of the valve disc 30 and permit full opening of the disc 30, while still trapping the opposite end portions of the hinge pin 52.

A modified retaining ring 76B, illustrated in FIG. 10, may be employed in the valve 20B in lieu of the retaining ring 76 previously described. The modified retaining ring 76B has an enlarged opening 78 at one side of the inner surface 80 of the ring to provide clearance for the transition 54 of the disc 30 when the disc 30 is moved to an open position. In this structure, the inner diameter of the retaining ring 76B is slightly smaller than the inner diameter of the ring 76 previously described.

As shown in FIGS. 11 and 12, an integral member generally designated by reference character 82 forming both a retainer and a hinge pin support may be provided if desired. The hinge pin support portion 36 is again in the form of a segmented ring providing flat surfaces 40 for supporting the opposite end portions of a hinge pin. A flange 76C projects radially from the member 82 at one end of the flat surfaces 40 to trap the opposite end portions of a hinge pin supported on the flat surfaces 40. The retainer flange 76C is provided with an enlarged, rectangular opening 84 to provide clearance for the transition of a valve disc when the disc is moved to a fully opened position. The combination member 82 can be used in any wafer-type valve structure when a separate valve seat is employed.

Another form of valve constructed pursuant to this invention is illustrated in FIGS. 13 and 14 and is generally designated by the reference character 86. The valve 86 has an upstream tubular body section 88 connected in end-to-end relation with a downstream tubular body section 90. Preferably, the body sections 88 and 90 are interconnected by threads 92 and the outer end portion of each body section is provided with internal threads 94 for securing the valve 86 in a threaded pipe flow system. In this form of valve, a modified valve seat ring 32A is formed on the inner end of the upstream body section 88 to provide a downstream facing annular seating area 38 and seal ring 40 therein to mate with the disc 30 when the disc 30 is in the closed position. The hinge pin support member 36 is anchored between the inner end of the upstream body section 88 and an annular retainer flange 96 formed in the downstream body section 90 and projecting radially inwardly from the walls of that body section. The inner diameter of the retainer flange 96 is sized such that the flange will overlap the opposite end portion 56 of the hinge pin 52 and yet provide clearance for the transition 54 of the disc 30 as shown in FIG. 14.

Another form of valve constructed pursuant to this invention is illustrated in FIGS. 15 and 16 and generally designated by reference character 100. The valve 100 includes a tubular valve body 102 having flanges 104 formed on the opposite ends thereof for mating with standard pipe flanges 106. Only one end portion of the valve body 102 is illustrated in FIG. 15 for simplicity of illustration.

A counterbore 108 is formed in one end of the valve body 102 providing an annular shoulder 110. The counterbore 108 is sized to receive a combination member 34 forming a valve seat and hinge pin support, with one end of the member 34 engaging the shoulder 110 and the opposite end being flush with the planar end 112 of the body 102. The member 34 is provided to support the opposite end portions of the hinge pin 52 of a disc 30 in the same manner as previously described. In this form of valve, the opposite end portions of the hinge pin 52 are held on the flat surfaces (not shown in FIGS. 15 and 16) by lugs 114 projecting radially inwardly from the body 102. There is a lug 114 for each end of the hinge pin 52, such that the transition 54 of the disc 30 will be free to move between the lugs 114 when the disc 30 is moved to a fully open position.

Changes may be made in the combination and arrangement of parts or elements as heretofore set forth in the specification and shown in the drawings without departing from the spirit and scope of the invention as defined in the following claims.

What is claimed is:

1. A swing check valve comprising:
   a body having a circular bore therethrough;
   a ring-shaped seat fitting in the bore of the body having an annular seating area on one end face thereof;
   a disc in said circular bore having a seating face sized to mate with the seating area of the seat and having a hinge pin thereon extending along an axis parallel with the seating face thereof, the opposite end portions of the hinge pin projecting from the disc;

a hinge pin support in the body forming a single of aligned flat surfaces positioned in a plane parallel with the centerline of the seating area of the seat and radially outwardly of said seating area;

the opposite end portions of the hinge pin resting on said flat surfaces, with the opposite ends of the hinge pin engaging the wall of the bore through the body; and retainer means in the body for holding the opposite end portions of the hinge pin on said flat surfaces.

2. A valve as defined in claim 1 wherein the seat and hinge pin support are formed integrally as one member.

3. A valve as defined in claim 2 wherein in the hinge pin support is in the form of a segment of a ring encircling over one-half the seating area of the seat, the opposite ends of said segment forming said flat surfaces.

4. A valve as defined in claim 1 wherein the seat and hinge pin support are separate members.

5. A valve as defined in claim 4 wherein the hinge pin support is in the form of a segment of a ring having an inner diameter greater than the seating area of the seat.

6. A valve as defined in claim 1 wherein the retainer means is a part of the valve body.

7. A valve as defined in claim 6 wherein the retainer means is in the form of a ring having an opening therethrough larger than the disc.

8. A valve as defined in claim 6 wherein the retainer means is in the form of a pair of lugs projecting radially inwardly in the body adjacent said flat surfaces.

9. A valve as defined in claim 1 wherein the retainer means is in the form of a separate ring secured in the body abutting the side of the hinge pin support opposite the seat and having an opening therethrough larger than the disc.

10. A valve as defined in claim 1 wherein the hinge pin support and retainer means are formed integrally as one member.

11. A valve as defined in claim 10 wherein the hinge pin support is in the form of a segment of a ring having an inner diameter greater than the seating area of the seat, and the retainer means is in the form of a lip projecting radially outwardly in spaced relation from the seat.

12. A swing check valve comprising:
a two-piece tubular body having the upstream and down stream sections thereof connected in end-to-end relation;

a valve seat in the upstream body section having an annular seating area facing downstream;

a disc in said body having a seating face sized to mate with the seating area of the seat and having a hinge pin thereon extending along an axis parallel with the seating face thereof, the opposite end portions of the hinge pin projecting from the disc;

a hinge pin support in the body forming a single pair of aligned flat surfaces positioned in a plane parallel with the centerline of the seating area of the seat and radially outwardly of said seating area;

the opposite end portions of the hinge pin resting on said flat surfaces, with the opposite ends of the hinge pin engaging the wall of the bore through the body; and retainer means in the body for holding the opposite end portions of the hinge pin on said flat surfaces.

13. A valve as defined in claim 12 wherein the opposite ends of the body are internally threaded and the hinge pin support and retainer means are in the downstream body section.

14. A valve as defined in claim 13 wherein the body sections are threadedly interconnected.

15. A valve as defined in claim 12 wherein the seat is a part of the upstream body section.

16. A valve as defined in claim 12 wherein the hinge pin support is in the form of a segment of a ring having an inner diameter greater than the diameter of the seating area of the seat.

17. A valve as defined in claim 12 wherein the retainer means is in the form of a ring having an opening therethrough larger than the disc.

18. A valve as defined in claim 17 wherein the retainer means is a part of the downstream body section.

* * * * *

UNITED STATES PATENT AND TRADEMARK OFFICE
CERTIFICATE OF CORRECTION

PATENT NO. : 4,852,607

DATED : August 1, 1989

INVENTOR(S) : John P. Scaramucci

It is certified that error appears in the above-identified patent and that said Letters Patent is hereby corrected as shown below:

Col. 5, line 4, immediately following the word "single", please insert the word -- pair --.

Signed and Sealed this

Twenty-ninth Day of May, 1990

*Attest:*

HARRY F. MANBECK, JR.

*Attesting Officer*      *Commissioner of Patents and Trademarks*